(12) United States Patent
Szentesi et al.

(10) Patent No.: US 7,366,108 B2
(45) Date of Patent: Apr. 29, 2008

(54) NETWORK TOPOLOGIES

(75) Inventors: Áron Szentesi, Budapest (HU); Gábor Magyar, Keeskernét (HU); Zoltán Király, Budakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 843 days.

(21) Appl. No.: 10/398,437

(22) PCT Filed: Oct. 2, 2001

(86) PCT No.: PCT/EP01/11385

§ 371 (c)(1),
(2), (4) Date: Apr. 2, 2003

(87) PCT Pub. No.: WO02/35871

PCT Pub. Date: May 2, 2002

(65) Prior Publication Data

US 2004/0017783 A1    Jan. 29, 2004

(30) Foreign Application Priority Data

Oct. 9, 2000   (GB)   ................ 0024679.3

(51) Int. Cl.
*H04L 12/28* (2006.01)
*H04Q 7/00* (2006.01)
*G06F 15/173* (2006.01)

(52) U.S. Cl. .................. 370/254; 370/328; 709/241
(58) Field of Classification Search ........ 370/254–256, 370/328, 338, 352, 238, 351; 709/241
See application file for complete search history.

(56) References Cited

U.S. PATENT DOCUMENTS 4,613,946 A    9/1986   Forman ............... 364/518

(Continued)

FOREIGN PATENT DOCUMENTS

DE          10014089 A1    3/2000

(Continued)

OTHER PUBLICATIONS

An Algorithm for Hierarchical Network Design; Mateus et al.; Location Science, vol. 2, No. 2; pp. 149-164.*

(Continued)

*Primary Examiner*—Wing Chan
*Assistant Examiner*—Hong Sol Cho
(74) *Attorney, Agent, or Firm*—Roger S. Blurleigh

(57) ABSTRACT

The present invention provides a method for optimization of the configuration of a hierarchical network having a first hierarchy level (LEVEL(j−1)), a second hierarchy level (LEVEL(j)) next below the first level, and a third hierarchy level (LEVEL(j+1)) next below the second level, each level comprising nodes (RNC's, HUB's, RBS's) each of which, in level other than the lowest, receives traffic from a cluster of nodes (HUB's, RBS's) of the level next below. The method comprises first determining an initial arrangement of nods (RNC's, HUB's, RBS's) in each of the levels other than the highest, allocating respective initial clusters of nodes (HUB's, RBS's) of that level to the nodes (RNC's, HUB's) of the next higher level, and performing optimizing iterations until they result in no changes in number, disposition and allocation of nodes (RNC's, HUB's, RBS's) over predetermined number of iterations.

12 Claims, 8 Drawing Sheets

U.S. PATENT DOCUMENTS

| | | | | |
|---|---|---|---|---|
| 5,067,148 | A | * | 11/1991 | Sardana ........................ 379/111 |
| 5,216,591 | A | * | 6/1993 | Nemirovsky et al. ........... 705/8 |
| 5,295,154 | A | | 3/1994 | Meier et al. .................... 375/1 |
| 5,394,436 | A | | 2/1995 | Meier et al. ................. 375/202 |
| 5,426,674 | A | * | 6/1995 | Nemirovsky et al. ........ 709/241 |
| 5,497,504 | A | * | 3/1996 | Acampora et al. ........... 455/436 |
| 5,504,746 | A | | 4/1996 | Meier ....................... 370/85.13 |
| 5,652,751 | A | * | 7/1997 | Sharony ...................... 370/227 |
| 5,680,633 | A | | 10/1997 | Koenck et al. .............. 395/800 |
| 5,711,000 | A | * | 1/1998 | Ploeg et al. ................. 455/423 |
| 5,740,366 | A | | 4/1998 | Mahany et al. ........... 395/20.12 |
| 5,748,619 | A | | 5/1998 | Meier .......................... 370/278 |
| 5,802,473 | A | | 9/1998 | Rutledge et al. ............. 455/423 |
| 5,826,218 | A | | 10/1998 | Khafizov et al. ............ 702/179 |
| 5,828,961 | A | | 10/1998 | Subramamian et al. ..... 455/446 |
| 5,862,477 | A | | 1/1999 | Wellard et al. .............. 455/423 |
| 6,014,705 | A | | 1/2000 | Koenck et al. .............. 709/230 |
| 6,046,992 | A | | 4/2000 | Meier et al. ................. 370/338 |
| 6,212,668 | B1 | | 4/2001 | Tse et al. ......................... 716/7 |
| 6,246,669 | B1 | * | 6/2001 | Chevalier et al. ............ 370/238 |
| 6,363,319 | B1 | * | 3/2002 | Hsu ............................ 701/202 |

FOREIGN PATENT DOCUMENTS

| | | |
|---|---|---|
| EP | 0756392 A2 | 1/1997 |
| EP | 0848567 A1 | 6/1998 |
| EP | 1091544 A2 | 4/2001 |
| WO | WO98/03023 | 1/1998 |

OTHER PUBLICATIONS

Using a Hop-Constrained Model to Generate Alternative Communication Network Design; Balakrishnan et al.; ORSA Journal on Computing; vol. 2, Spring 1992; pp. 192-204.*

Cost-Based UMTS Transport Network Topology Optimization; Harmatos et al.; pp. 1-8.*

An Algorithm for Hierarchical Network Design by Gerald R. Mateus et al.; Location Science, vol. 2, No. 3; pp. 149-164, 1992.

Technical Note; Generalized Hierarchical Facility Locations by Pitu B. Mirchandani; Transportation Science, vol. 21, No. 2, May 1987; pp. 123-125.

Minisum Hierarchical Location-Allocation Problems on a Network: A Survey by S.C. Narula; School of Business, Virginia Commonwealth University; pp. 257-272, 2003.

The pq-Median Problem: Location and Districting of Hierarchical Facilities—II. Heuristic Solution Methods by Daniel Serra et al.; Location Science, vol. 2, No. 2, pp. 63-82 (1994).

The Nested Hierarchical Median Facility Location Model by Jerry R. Weaver, et al.; Reed; Jun. 1989; pp. 100-115.

Using a Hop-Constrained Model to Generate Alternative Communication Network Design by Anantaram Balakrishnan et al.; ORSA Journal on Computing; vol. 2, Spring 1992; pp. 192-204.

Topological Design of Telecommunication Networks—Local Access Design Methods by Bezalel Gavish; Annals of Operations Research 33 (1991); pp. 17-71.

Topological Design of Computer Communication Networks—The Overall Design Problem by Bezalel Gavish; European Journal of Operational Research 58 (1992); pp. 149-172.

Facility Location and Capacity Acquisition: An Integrated Approach by Vedat Verter et al.; Naval Research Logistics; vol. 42; (1995); pp. 1141-1160.

A Generalized Approach to Modeling the Hierarchical Location-Allocation Problem by Yair Eitan et al.; IEEE Transactions on Systems, Man and Cybernetics; vol. 21, No. 1 (Jan./Feb. 1991); pp. 39-46.

Hierarchical Optimization: An Introduction by G. Anandalingam et al.; Annals of Operations Research 34 (1992); pp. 1-11.

Impact of Clustered Traffic Distributions in CDMA Radio Network Planning by Ulrich Ehrenberger et al.; University of Würzburg; Institute of Computer Science; Research Report Series; Report No. 223; Mar. 1999; pp. 1-14.

Demand-based Radio Network Planning of Cellular Mobile Communication System by K. Tutschku; University of Würzburg; Institute of Computer Science; Research Report Series; Report No. 177; Jul. 1997; pp. 1-20.

Optimization of the Fixed Part of GSM Networks Using Simulated Annealing by Paul Kallenberg; Bell Laboratories, Lucent Technologies; pp. 281-286, 2003.

Cost-Based UMTS Transport Network Topology Optimization by János Harmatos et al.; pp. 1-8, 2003.

Traffic Design Method for Large-Scale Switched Telecommunication Networks by Kenichi Mase et al.; NTT Telecommunications Networks Laboratories; Electronics and Communications in Japan; Part I: Communications (Aug. 1995); No. 8; pp. 10-22.

Network Constructing Algorithm Based on Link Significance Evaluation—Nable by Noriyuki Ikeuchi; NTT Telecommunications Networks Laboratories; Electronics and Communications in Japan; Part I: Communications (Feb. 1990); No. 1; pp. 30-41.

* cited by examiner

RNCs: 19
HUBs: 19
RBSs: 1000

RNCs: 7
HUBs: 69
RBSs: 1000

NETWORK TOPOLOGIES

TECHNICAL FIELD OF THE INVENTION

The present invention relates to optimization of hierarchical network topologies. The present invention is applicable in particular to the optimization of the configurations or topologies of access networks, especially mobile access networks, in communications systems.

Technical background and problem addressed by the present invention

The optimization of the topology or configuration of hierarchical networks, in particular access networks in communications systems, is an extremely important issue in the design and structuring of communications systems, especially in the case of mobile access networks (for example, GSM—Global System for Mobile Communications—or UMTS—Universal Mobile Telecommunications System). Some reasons why the optimization of the configuration of access networks in particular is important are as follows:

- The typically smaller link capacities in an access network are more sensitive to improper dimensioning than the large backbone links in the fixed or infrastructure part of the communications network. Providing an appropriate configuration is therefore crucial in order to obtain the required quality of service.
- Access networks represent a major part of the overall communications network structure, and of total network cost, considering only the sheer size of such access networks. Optimizing network configuration can therefore decrease overheads in terms of equipment, and total network cost, significantly.

Design of a network topology or configuration, such as an access network configuration, has in the past been effected manually. However, factors such as those mentioned above have provided motivation towards the use of optimization algorithms in the design of networks, including access networks. In addition to such factors, there are also additional practical arguments which favour of the use of algorithmic optimization in network design, in particular access network design:—

- The size complexity of networks such as access networks can be enormous (especially in case of mobile access networks), making manual network configuration or planning a difficult and time-consuming task.
- The quality of solutions (i.e. network configurations) obtained by algorithmic optimization can be superior to that of solutions arrived at by manual planning.
- Manual network planning requires special expertise; on the other hand, a network planning tool with optimization algorithms can be efficiently operated by less experienced personnel.
- Requirements for quick deployment of access networks allow only very short time periods for network planning work. Algorithmic optimization can help speed up the design process considerably.
- Quick algorithmic optimization allows the evaluation and comparison of various possible deployment strategies; typically this is impossible or scarcely possible in case of manual network planning within the available (very short) timeframes.

However, the use of algorithmic optimization of network topologies, for example access network topologies, is also subject to difficulties. The problem posed by algorithmic optimization is computationally intractable (i.e. NP-hard— see literature reference [11] identified in the list of literature references at the end of this description). This means that it cannot be expected that a globally optimal network configuration or topology can be found, as this would take billions of years of computational time.

Various approaches which have been used in efforts to reduce the intractability of the problem, but nonetheless to provide procedures acceptable for use in optimization of network topologies or configurations, have proved to be unsuitable in practice. These approaches are in general either not suitable for handling networks of great size complexity, such as is the case in practice for access networks, or are restricted in their use in such a manner that they can deal only with special cases which do not correspond to situations which arise in practice.

SUMMARY

Solution Provided by the Present Invention

The present invention provides a method for optimization of the configuration of a hierarchical network comprising a plurality of hierarchy levels each comprising nodes each of which receives aggregated traffic from a cluster of nodes of the hierarchy level below. An initial arrangement of nodes is generated and then steps are carried out to identify optimized numbers and optimized dispositions for nodes of levels of the hierarchy other than the lowest level. In the optimization of the nodes of a first level considered, the nodes of all other levels are maintained unaltered. Optimized numbers and optimized dispositions for nodes of a second, adjacent level considered are then identified on the basis of the optimized nodes of the first level considered. Thereafter, optimized new clusters are identified for the nodes of the lower of the first and second levels. These steps may be iterated a desired number of times for the adjacent levels. The steps may then proceed to optimization of further levels of the hierarchy as required, proceeding upwards through the levels, or downwards, or proceeding through the levels in an arbitrary order.

Expressed simply, it can be said that the method of the present invention involves identifying an optimized number of nodes and recalculating the dispositions of the nodes, then reallocating the nodes on a lower hierarchy level to the nodes on a higher hierarchy level downwards, then upwards, first with nodes fixed on the on the higher hierarchy level, then with nodes fixed on the lower hierarchy level.

Advantages of the Invention

The present invention provides an optimization method which may be embodied as a part of a network planning software tool, which can solve the problem of optimization, in particular cost-optimization, of the topologies or configurations of networks such as access networks in practical situations. The present invention can provide solutions (i.e. network topologies or configurations) which may be suboptimal solutions (i.e. in the sense that they may be less than an ideal solution, the provision of which is an intractable— NP-hard—problem as indicated above) but which are good near-optimal solutions which can be attained in practically reasonable computational running times and which are applicable to practical networks of the size complexity which arises in the real world.

The network optimization methods in accordance with the present invention, in particular cost-based optimization methods can play a central role in network planning software tools. The quality and efficiency of the methods can have an important influence on the usefulness of these tools and, of course, on the quality, robustness and cost-effectiveness of the network.

The practical advantages of the invention are manifold. Methods in accordance with the invention provide means by which optimized network topologies or configurations can be generated for complex networks, such as access networks, in a practical manner, within a realistic timescale, without requiring great computational power. The methods are extremely flexible and can take into account any arbitrary cost structures, equipment restrictions and traffic levels, which can be provided as inputs for the generation of the optimized network topologies. Further, the benefits of the invention are of course also carried over in terms, for example, of cost-savings, improvements to quality of service, etc, into networks constructed in accordance with the optimized topologies.

The invention is primarily related to hierarchical access networks. Many types of this kind of network exist and are used heavily at present in telecommunications systems (e.g. GSM networks) and further such networks are planned in the future (e.g. UMTS). However, the invention is generally useful in cases in which there are hierarchical levels of objects that are to be systematically interconnected with each other (e.g. star-star formation), especially in cases in which the objects and their connections are subject to capacity and/or other types-of constraints or restrictions.

The cost structures of such objects and connection links can be very complex in practice and, furthermore, the costs of objects on different levels can depend on each other—for example in consideration of the fact that aggregation of data (e.g. traffic) is needed from a lower level to an upper level (or in other cases vice versa), which can play an important role in the calculation of the cost of objects and connection links.

Embodiments of the invention may be concerned in particular with cost-optimization. However, it will be understood that the "cost" can be composed of many different factors and is not limited to financial costs. In general, during optimization, the composite cost (or utility) function—i.e. the objective value of a generalized cost function—is to be minimized (or maximized). Quality of service factors can be taken into account in the cost model.

One of the key advantages of embodiments of the invention is that arbitrary equipment and link cost functions (e.g. depending upon aggregated traffic) can be efficiently handled. The flexibility of embodiments of the invention, enabling them to handle arbitrary cost functions, is of great practical significance since the cost system has been one of the biggest difficulties in dealing with the problem of network optimization.

BRIEF DESCRIPTION OF THE DRAWINGS

FIG. 4b schematically illustrates an initial network configuration for the array of FIG. 4a;

Before proceeding to a description of embodiments of the present invention, some issues relevant to the present invention will first be described, in particular in relation to communications networks and access networks for such communications networks. It will be understood, however, that the present invention—although of particular value in the context of such access networks—is not restricted to use in relation to such access networks. The present invention can be applied also in the context of other types of hierarchical network.

Communication networks are typically separated into two major parts:

1. The backbone network, which consists of high-capacity switching equipment interconnected by a mesh of high-bandwidth links. The backbone network interconnects different areas of the access network and interfaces towards other (external) networks.
2. The access network, which carries traffic between user terminals and the backbone network nodes.

These two parts of the network (i.e. the backbone network and the access network) are typically planned or configured, and operated, separately. For the purposes of this description, access networks will be considered.

Access networks are typically built in a hierarchical structure; end user traffic originating from the primary access nodes (e.g. mobile telephones or other mobile equipment or hosts) is collected and forwarded towards the backbone network by concentrator nodes. The most common network topology is a set of tree structures. Examples for the use of this approach are GSM and UMTS access networks.

Figure 1:
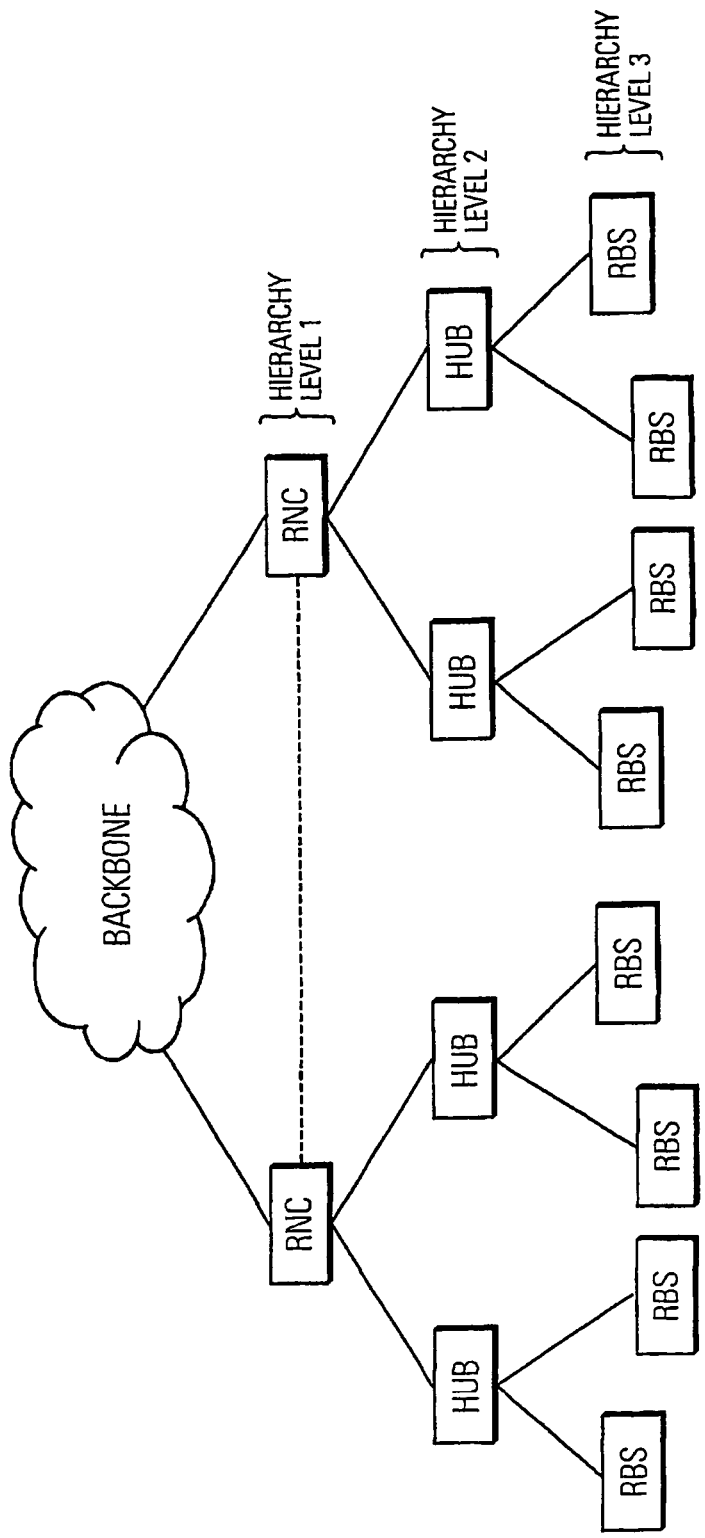
FIG. 1 schematically illustrates the hierarchical structure of a UMTS (Universal Mobile Telecommunications System) access network (UTRAN —UMTS Terrestrial Radio Access Network)

FIG. 1 schematically illustrates a hierarchical tree structure topology or configuration in the case of a UMTS communications system, showing the backbone (network) and the access network having a tree structure comprising RBS's (Radio Base Stations), with which primary access nodes (not shown) such as mobile telephones communicate via radio, HUB's which concentrate traffic from RBS's, and RNC's (Radio Network Controllers) which concentrate traffic from HUB's toward the backbone (which RNC's, as indicated by a broken line, may communicate with one another).

The network elements can be basically classified as:
a) node equipment (e.g. RBS's, HUB's, RNC's) at network sites, and
b) transmission capacities (links) for interconnecting nodes.

The main goal of optimal planning or configuration of such networks can be stated as that of finding a configuration or topology of the network elements which:

provides the desired connectivity and capacity (in terms of both switching and bandwidth), does not violate the technological constraints of the selected equipment (i.e., number of ports per switch etc.), has the minimum possible deployment and operational cost.

The planning or configuration task is therefore constrained by the following three main factors:

traffic offered to the network, technological parameters (possibilities, requirements and constraints) of the equipment used, cost model Naturally, the above factors are subject to and determined by the actual type of network considered. It is very important, when considering optimization methods, procedures and algorithms, that flexibility and robustness are supported, i.e. it has to be possible to take into account many possibilities with regard to cost structure, equipment configuration etc.

Considering, as an example, the structure of a typical UMTS access network (UTRAN), the network consists of the following three types of node equipment:

Radio Base Stations (RBS's), which are the terminal nodes where the traffic demand arises. These units interface the radio signals of the mobile stations (mobile phones or other mobile equipment) with the fixed transport network. The traffic of the RBS's is transported to and from the backbone network through the HUB's (HUB RBS's) and Radio Network Controllers (RNC's).

Concentrators (HUB RBS's or, more briefly, HUB's), which each concentrate the traffic of several RBS's to one outgoing link upwards to a Radio Network Controller.

Radio Network Controllers (RNC's), which—among many other tasks—collect the traffic of the RBS units and transmit it towards the backbone.

The interconnection of the above three types of equipment is effected, as illustrated in FIG. 1, in a hierarchical tree-like fashion: the RBS's of hierarchy level 3 are connected to HUB's of hierarchy level 2, and the HUB's are connected to RNC's of hierarchy level 1. A HUB may concentrate traffic of many RBS's, and an RNC may receive aggregated traffic of many HUB's. Optionally, as mentioned above, there can also be inter-RNC transmission capacities (depicted by the broken line in FIG. 1). In some cases, RBS's may be directly connected to RNC's, as RNC's have the same capabilities as HUB's.

In the following, the above-described UMTS access network model will be considered as a reference model for the purpose of describing or defining the problem addressed by the present invention, and for describing the solution afforded by the present invention. The above model is also suited for considering various other kind of networks (for example, in case of consideration of GSM networks, it is necessary simply to substitute BTS's (Base Transceiver Stations) for RBS's, and BSC's (Base Station Controllers) for HUB's, etc.).

In the context of this network model, the aim or task of the present invention can be understood as follows:—

Task: to find an optimized (e.g. minimum cost) access network topology or configuration on the basis of the following input parameters and objectives.

Input: the solutions (i.e. the topologies) have to be optimal with respect to the following input parameters:

RBS locations: In the planning or configuration of an hierarchical access network, the number of RBS's and their locations are given as input, determined by radio network planning methods as described for example in literature references [1,2]. These RBS's or RBS locations will often be referred to below as sites or points.

Offered Traffic: The estimated traffic demand generated by each RBS is also estimated in advance, and it is another input to the access network planning problem.

Cost structure: The two factors contributing to total network cost are the cost of node equipment and the cost of transmission facilities (links).

Nodal costs: The cost structure of the three types of node equipment (RBS, HUB, RNC) has to be given in detail.

1. RBS costs are not directly relevant to the optimization of network topology as the RBS sites are determined previously and given as input for the optimization.

2. In the access network planning problem, HUB's and/or RNC's are typically to be installed at certain selected RBS sites to provide the proper functionality. However, the present invention can deal also with cases in which HUB's and/or RNC's are not installed at selected RBS sites but are arbitrarily positioned. The cost of establishing a HUB or RNC equipment at a network site (either a selected RBS site or another non-RBS site) can be expressed by a complex function of the incoming total traffic to the site, the number of RBS's belonging to the site, the exact number of incoming connection links to the site and the geographical location of the site. It is important to be able to handle non-linear, not continuous, general equipment cost functions, because in practice these costs are typically composed of individual discrete cost elements which stand for certain device units installed at the HUB or RNC site for fulfilling the designated traffic requirements.

Link costs: Costs for establishing the transmission links between the network sites have also to be given, as a function of the physical distance of the link (or determined by its endpoints) and the required bandwidth of the link. Practically relevant link cost functions are typically non-linear (stepwise) functions.

Technological requirements and constraints:

1. Connectivity: All the RBS's must be connected to HUB's, and the HUB's must be connected to RNC's, forming a multi-tree-like network structure.

2. Capacity: The access network has to provide sufficient capacities in order to accommodate all the given offered traffic (all the way from the RBS's to the backbone).

3. Equipment limitations: The nodal equipment can have certain kinds of technological constraints limiting the number of acceptable topologies. One example is the maximum number of ports (per HUB or RNC), limiting the number of RBS's to be connected to a HUB, for example.

Objective: The task is to find an access network topology fulfilling the imposed requirements and constraints at the least total cost, for example. The total cost of a network topology configuration is calculated by summing up all equipment and link costs.

Output: The solution or design of the optimized network configuration should contain the following information:

number and location of RNC's number and location of HUB's links connecting the RBS's to HUB's (together with their capacity)

links connecting the HUB's to RNC's (together with their capacity)

The access network planning or configuration problem outlined above is computationally hard. It can be classified as a special kind and complex optimization problem belonging to the fields of hierarchical clustering and/or hierarchical facility location. Beyond the fact that the clustering of the sites has to be done hierarchically, an even bigger difficulty lies in the complex cost function embedded in the problem.

Clustering methods (see literature reference [5]) and location problems (see literature references [6,7]) have been widely studied. The main factors that make the state-of-the-art approaches in the above-mentioned fields unsuitable for practically relevant solution of the access network planning or configuration problem lie in the very special structure of the problem itself:

The problem is hierarchical and the different levels depend on each other simultaneously. Even if there were only one fixed RNC, and a set of RBS's, finding the optimal number and location of HUB's would be a costly operation. However, having multiple RNC clusters leads to a still more complicated situation.

Both the optimal locations of HUB's (and RNC's) and the allocations of RBS's to HUB's (and HUB's to RNC's) must be determined simultaneously, since the optimal HUB (and RNC) locations depend on the allocated total RBS (HUB) traffic, and the optimal allocations of RBS's (or HUB's) depend on the location of the HUB (and RNC) sites.

The desired (optimized) number of RNC's and HUB's is not known in advance, it has to be determined also by the optimization or solution method adopted. Most existing heuristics that could be applied to certain subproblems of the whole optimization problem require that the number of clusters (or facilities) is explicitly given in advance.

The cost of facilities is not fixed, but is a complex function of the aggregated traffic for the given site and some other factors. For a fixed geographic location where opening a facility is possible, the cost factor is a non-continuous function of three variables (traffic, number of RBS's, number of incoming links), and the function or functions are not known at the phase of planning the algorithm for network optimization: they are the part of the input. The incoming traffic to each site has to be aggregated from all different network levels. If a small change is made in the network configuration, many individual cost elements will change (HUB equipment costs, RNC equipment costs, and link costs) simultaneously and rapidly. Moreover, the influence of these complicated facility costs dominates the overall cost.

Even if the location of the facilities are selected, the optimal allocation of RBS's to HUB's and HUB's to RNC's is a hard task, as the link cost structure can also be arbitrary. This, however, is a relatively easier task, but as mentioned above, this phase can also not be separately treated. The straightforward rule of connecting sites on a shortest distance basis does not work in the case of stepwise or even more sophisticated equipment cost functions.

Existing approaches (see literature references [3,4]) for access network planning use a generally applicable local search metaheuristic called simulated annealing (see literature references [8,9,10]), often combined with greedy heuristic subphases. These approaches basically can deal with any kind of cost function. However, they again have several shortcomings:

It is hard to define the suitable neighbourhood and move operators for the basic method in the case of hierarchical network design. Either the search space would be too large, resulting extremely long running times, or the algorithm search capabilities would be limited, both of which should be generally avoided.

The practically relevant stepwise—or perhaps even more sophisticated or complex—equipment and link cost structures raise difficulties for these methods and they often cannot provide reasonable solution quality.

More importantly, the computational resources required for these heuristics are rather large, which limits their efficient application to problems which are of limited size (e.g. involve only a few hundred network sites), which are irrelevant to practical cases.

The many papers and books which can be found in the literature relating to the access network planning or configuration problem unfortunately deal only with some substantial simplifications of practically occurring problem addressed by the present invention.

The most widely studied related area in the literature is Location Theory (see literature references [6,7]). Many different models and problem formulations are studied here, but most of them can be considered as integer (or mixed integer) linear programs, so these problems are too far distant from the practically occurring problem addressed by the present invention, where the objective function cannot be expressed as a linear function of variables and constants.

If the objective function is convex then techniques of convex programming can be used. For example in the so-called HUB Location Problem (see section 8.7 in literature reference [7]) the objective is quadratic. This assumption is, however, also too far distant from the practically occurring cases to which the present invention relates. If, as a special case, the input cost functions were explicitly given as a sum of three piecewise linear functions of one variable then the problem could be transformed to an integer quadratic program, but for cost functions close to practical or real functions the number of variables would become out of control due to the high number of 'pieces' which would be needed to specify a piecewise linear function.

In literature reference [12], for example, there is only one level of facilities, and constant facility costs, but the link costs depend on the traffic in a concave way. In this reference a piecewise linear approximation of these (a priori known) concave functions is employed.

Global Optimization in Location (see Chapter 3 in literature reference [6])) can handle even non-continuous objective functions but looks for solutions in Euclidean space, i.e. facilities can be placed anywhere in that space (or in a subset formed by the union of a finite number of convex polygons). Solution methods are known for the case where the objective is a linear function of the distance (using geometric methods), or if the objective is a difference of two convex functions, or if the objective can be approximated efficiently as sum of functions of one variable that do not change many times from convex to concave or vice versa.

Some other Location Theory papers of relevance are found it literature references [13-20]. They deal with linear cost functions but hierarchical facility location.

In the network design problems addressed by the present invention, the aim is to find an optimized (e.g. minimum cost) subgraph satisfying various constraints. Related papers are found in literature references [21-23], which deal with similar constraints to those applicable to the present invention but are able to use only simple (cost) functions.

As noted previously, the present invention cannot guarantee to find the globally optimal solution for network configuration optimization because the inherent problem belongs to the family of computationally intractable problems (i.e. almost all of the subproblems of the main problem are NP-hard—see literature reference [11]). However, the present invention can provide good near-optimal solutions in reasonable (computational) time.

To solve the access network planning or configuration problem outlined above, and to overcome the difficulties pointed out above, it might be said that the present invention employs a type of 'divide and conquer' approach; a hierarchical problem decomposition approach is followed.

The present invention applies independent iterative clustering phases for solving for the optimized location of sites at the different levels of the hierarchy. Several local optimization phases may also be applied to improve and merge the results coming from the clustering subphases. Local optimization may be effected both inside and in between the clustering subphases to yield a final result with high-quality. The application of the clustering and local optimization (if used) subphases is guided by a global control algorithm.

A main feature of the present invention is to perform the optimization of location of nodes at each hierarchical (network) level individually and separately, and preferably to apply local optimization to improve the interconnection between the different network levels. It should be understood that the present invention can work with any number of network hierarchy levels (in the description of embodiments of the present invention given below reference is made to the three level UTRAN example, but this is merely by way of example).

Figure 2:
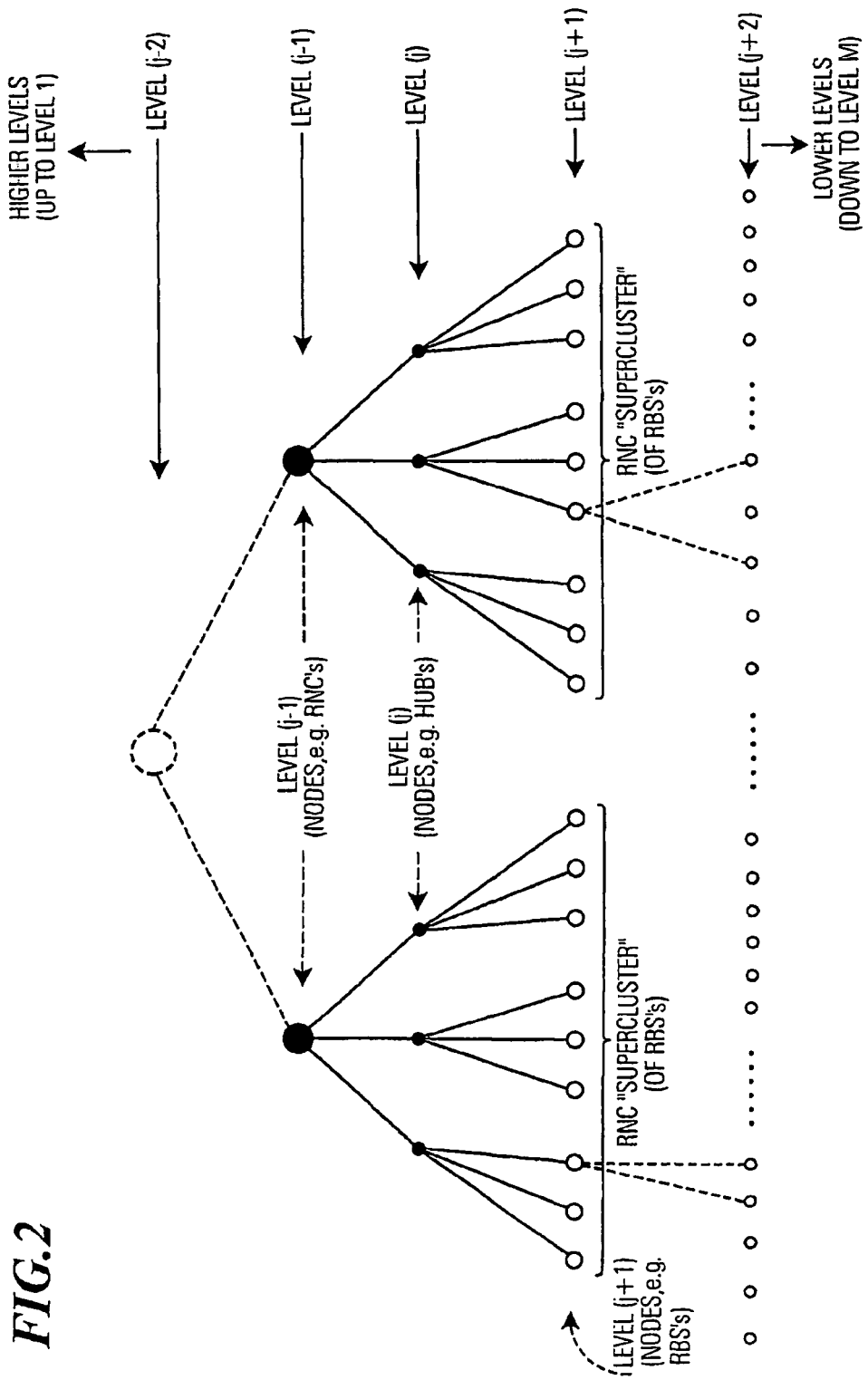
FIG. 2 schematically illustrates a hierarchical network structure, for assistance in explanation of the present invention.

Referring for example to the schematic illustration of FIG. 2, and assuming that there are m levels in the network topology under consideration (level 1 being the highest level, and level m being the lowest), when improving (optimizing) the actual configuration by means of the present invention, each network level (except the lowest level, which is fixed or predetermined; e.g. in an access network the number and locations of RBS's, which represent the lowest network level are fixed or predetermined) is iteratively gone through, and the number and positions of nodes at this level, for example level j, are recalculated and the connections are re-established with nodes on the levels (for example j−1 and j+1) adjacent to this level. When doing this for each level, for example for network level j, the locations of nodes at levels j−1 and j+1 and naturally all other levels are taken as fixed and only the nodes of level j can be changed. For the recalculation in respect of level j, the nodes of the next higher level (level j−1) define segments of the multi-tree network which are considered at one time in the recalculation for level j. That is, as is indicated in FIG. 2, each node on level j−1, through its connections to nodes on level j and the connections of those nodes to nodes on level j+1, corresponds to a segment of the multi-tree network, which segment includes a set of nodes of level j+1. The segments are gone through iteratively, for all j−1 level nodes (If the calculation is performed for the highest network level 1, naturally the whole network is considered). The set of level j+1 nodes in each tree segment defined by the appropriate j−1 level node (which set of j+1 level nodes can be called a "supercluster") form the input point set for re-clustering to identify new level j nodes for that tree segment (i.e. for the j−1 level nodes concerned). That is, the number and positions of level j nodes for each tree segment are recalculated by identifying new, optimized clusters of the level j+1 nodes, and cluster "centers" at which the recalculated level j nodes are located. The levels in respect of which the nodes are recalculated (i.e. different "j" levels) are iterated, either from down to top through the network levels (i.e. from level m−1 to level 1), or from top to down (from level 1 to level m−1), or they can also be randomly chosen (between 1 and m−1). The iteration of the recalculation is the crucial effect to enable the propagation of the local changes in the network topology. In FIG. 2, the nodes of levels j−1, j and j+1 are labelled as RNC's, HUB's and RBS's, simply for ease of understanding. It will be understood that if those nodes are RNC's, HUB's and RBS's there may no other hierachy levels (i.e. m=3) such as are shown in FIG. 2.

In the case of the UMTS access network example, in which there are three node levels as shown in FIG. 1 (LEVEL 1—RNC's, LEVEL 2—HUB's, LEVEL 3—RBS's), an embodiment of the present invention works by separating the location of HUB's and the location of RNC's into two distinct phases. By means of this approach, the size of the actual clustering problem treated at one time is reduced drastically, therefore the (computational) running time involved is practically acceptable.

In the context of this network example, in an embodiment of the present invention the algorithm employed starts with an initial network configuration (from now on a network configuration is often referred to as the or a "solution"), and iteratively improves that configuration or solution towards the global optimum by performing two clustering subphases alternately on the actual configuration. The two subphases are as follows:

a) clustering the RBS's belonging to each actual RNC, iteratively for each RNC of the actual solution (i.e. the currently available solution or configuration, provided by the last iteration) to find the optimal number and locations of HUB's within these actual sets of RBS's, then b) clustering all the HUB's to find the optimal number and locations of RNC's within the actual set of HUB's.

At the first subphase, when finding the optimal number and location of HUB's, the actual RNC positions of the current solution are fixed. The points (i.e. RBS's) belonging to an actual RNC form an RNC supercluster. The actual HUB's of the current solution are then deleted and new HUB's are found for the same RNC supercluster (of RBS's) by (re)clustering only the RBS's belonging to that RNC. This process is repeated for all the RNC superclusters of the current solution.

At the second subphase, when finding the optimal number and location of RNC's, the actual HUB positions and the allocated RBS's are fixed. Then, the RBS's are totally ignored and each HUB, with the RBS's belonging to it, is taken as one unit. The actual set of RNC's is then deleted and new RNC's are found for the given set of HUB units by the applied clustering method.

The efficiency of this network planning approach arises from the fact that, at the first subphase, performing the recalculation of HUB's only within each RNC supercluster, one by one at a time, is computationally much more favourable than treating the RBS set as a whole and recalculating the HUB's for all RBS's at the same time. For instance, if there are 5000 RBS's, and ca. 200 RBS for each RNC, then it is necessary to repeat the clustering algorithm 5000/200=25 times for n=200 points. If the clustering algorithm has a minimal time complexity of $O(n^2)$, then its running time is $25 \times 200^2 = 10^6$ which is, even in this simple case, much less than the complexity when treating the whole set, which is $5000^2=2.5\times10^7$. In practice, the complexity of the clustering phase is worse than is indicated above, which yields an even stronger difference between the two complexity figures. Similarly, at the second clustering phase, the actual input point set for the HUB clustering will also be much smaller than the total number of points, because the RBS's are effectively considered as incorporated into their corresponding HUB's. Following the above example, if each HUB has ca. 25 RBS's belonging to it on the average, then a point set of 5000/25=200 has to be handled, instead of the whole 5000.

In an embodiment of the present invention, the two subphases can basically follow the same clustering algorithm, and only the cost calculation has to be different and adjusted properly depending on which phase is actually being performed.

Two types of clustering techniques have been implemented in examples of embodiments of the present invention. These techniques are described in more detail below. One technique is partially known from the literature, being based on the K-means algorithm, or Generalized Lloyd's Algorithm (GLA)—see literature reference [5]. However, in the technique implemented in an embodiment of the present invention, the basic K-means algorithm is adjusted and improved to meet the special features of the access network planning problem. Another alternative technique for clustering has been developed which is based on simple heuristic rules and works by iterative splitting of the actual point set. The two clustering techniques may be applied simultaneously, or only one of them may be preferred, in embodiments of the present invention. The choice of which of the two clustering methods is to be applied is free. However, in a preferred embodiment of the present invention there is used a control algorithm for selecting which clustering method should be applied in the current clustering phase, which first favours the application of the quicker and therefore computationally lighter iterative splitting method and then gradually changes to the application of the computationally heavier K-means-based clustering when the iterative splitting method cannot improve the actual solution any more.

It should be noted that the general approach is modular, and that therefore further techniques can also be applied for the clustering subphases. The applied two clustering methods are designed in such a way that the number of desired clusters is not known in advance.

In accordance with an embodiment of the present invention, the recalculation of HUB positions and then the recalculation of RNC positions by the selected clustering method is iterated until a suitable stopping criterion is met. In order to improve the quality of the actual solution, to merge the two individual subphases, and to facilitate the migration of points in between the actual HUB (and RNC) clusters, local optimization may be performed in the current solution every now and then. At local optimization, a neighbourhood search is performed, where small reorganizations—such as swapping two sites, or moving one site from one cluster to another cluster—are performed iteratively until they do not yield any further improvement in the solution quality. Local optimization may be effected both inside the clustering subphases and in between these phases. When applying local optimization procedure inside the clustering phase, it helps in finding a better clustering configuration within the defined constraints for that clustering phase. When applying local optimization in between the two clustering phases, it helps in providing possibilities to merge the outcome of the two clustering phases into a good new solution.

For embodiments of the present invention, a set of local improvement operators has been defined for the network planning problem and a system developed for the control of their efficient application. Local optimization can be applied at different levels of complexity in the whole process depending on the size of the network planning problem. This feature can enable embodiments of the present invention to provide reasonable (computational) running time and solution quality in all practical cases. The control of the local optimization levels may be embedded in the global control algorithm of the embodiment of the present invention.

The global control algorithm in accordance with an embodiment of the present invention can be summarized algorithmically as follows:

1. (Initialize) Generate an initial solution.
2. (Iteration) Iterate the following basic steps until the termination condition is met:
    2.1 (Clustering Phase 1—new HUB's) For all RNC clusters do:
        2.1.1. (Clustering) Identify the optimal number and recalculate the positions of HUB's within the actual RNC cluster. Reallocate the RBS's of the actual RNC cluster to the new HUB's.
        2.1.2. (Inner Local Optimization) Apply local search operators for improving the allocation of RBS's to the new HUB's.
    2.2 (Outer Local Optimization 1) Apply local search operators for improving the allocation of the RBS's to any of the HUB's in the current solution.
    2.3 (Clustering Phase 2—New RNC's) Recalculate the position of RNC's for the actual set of HUB's:
        2.3.1 (Clustering) Ignore the actual RNC positions and generate a new set of RNC's for the whole set of HUB's in the current solution. Reallocate the existing HUB's to the new RNC's.
        2.3.2. (Inner Local Optimization) Apply local search operators for improving the allocation of HUB's to the new RNC's.
    2.4 (Outer Local Optimization 2) Apply local search operators for improving the allocation of the RBS's to any of the HUB's in the current solution.
3. (Termination) If the best solution found so far has not been improved in a pre-specified number of successive iterations, stop. Otherwise continue with step 2.

Figure 3:
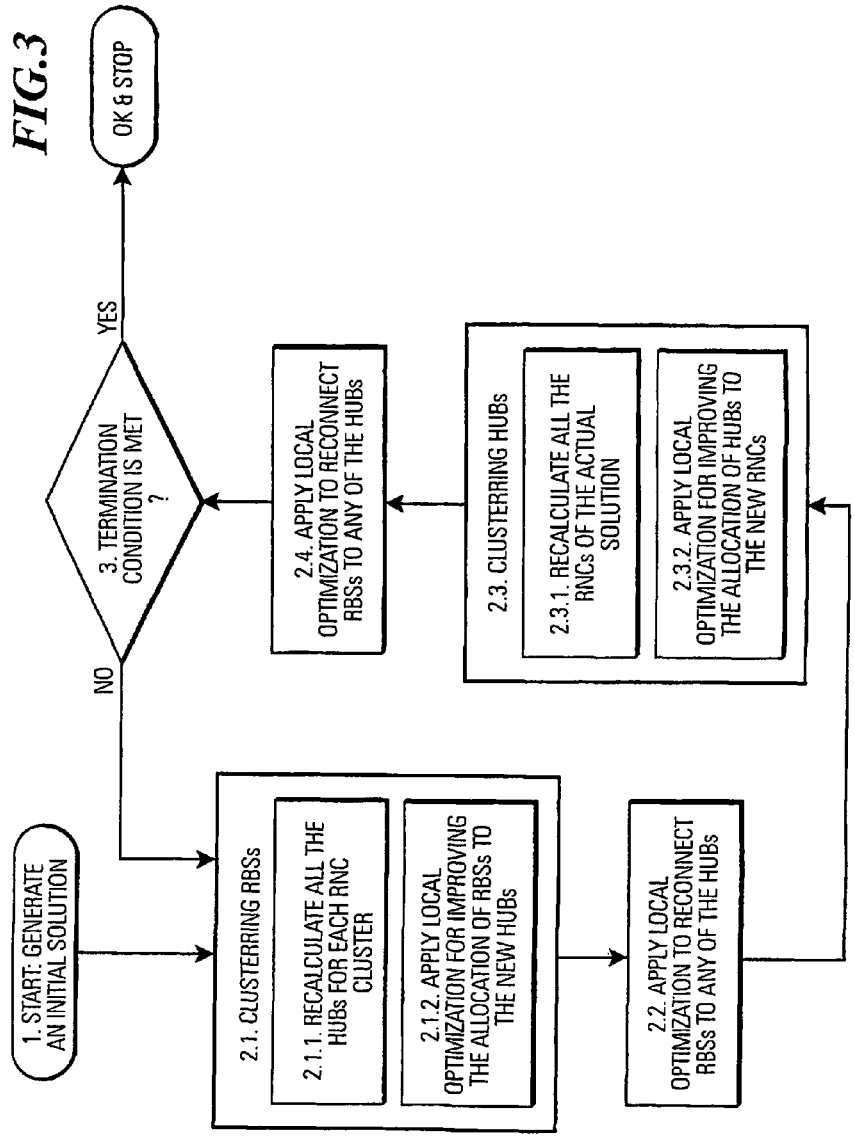
FIG. 3 is a flow chart for a global control algorithm of an embodiment of the present invention, for determining or planning an access network configuration or topology.

The above global control algorithm is depicted in the flowchart of FIG. 3.

There are certain open decisions in the above global control algorithm, e.g. which of the two clustering methods mentioned above should be applied at the clustering phases, what level of local optimization should be performed, etc. These issues are considered further below, following description of the individual clustering methods and the levels of local optimization in greater detail.

In the following the individual phases and procedures involved in the above global control algorithm are considered: the proposed clustering methods, the issues of proposed local optimization procedures and method of generating an initial solution for the whole algorithm. Thereafter, the control algorithm is described further, and finally a practical example is shown to illustrate the usability and efficiency of the approach employed in accordance with the present invention.

Clustering Methods

Independently of which clustering phase (finding new HUB's with fixed RNC's, or finding new RNC's with fixed HUB's) is to be solved, the following problems have to be addressed when performing the clustering of an actual point set:
- a) identify the number of clusters (denoted by k),
- b) select the location of the desired k cluster centers (HUB's or RNC's),
- c) allocate the point set to the selected cluster centers.

When deciding the number of clusters, selecting the cluster centers and allocating the elements of the actual point set to the selected cluster centers with minimal cost, the cost calculation depends on the type of clustering currently being performed. If the point set contains HUB's, the RNC equipment cost structure is applied when calculating the cost of the cluster center RNC's, and the HUB-RNC link cost structure is used when calculating the allocation costs for the cluster members. If the point set contains RBS's, the HUB equipment cost structure is applied when calculating the cost of cluster center HUB's, and the RBS-HUB link cost structure is used when calculating the allocation cost for cluster members.

In the following the above-mentioned two types of clustering method are described in more detail. The places where inner local optimization (steps 2.1.2. or 2.3.2. of the global control algorithm) can be performed are indicated in the description of the algorithms below.

K-means-based Clustering

The K-means method for clustering data is well-known (see literature reference [5])). In the original K-means method the number of resulting clusters (K) must be specified in advance. The method starts with K random cluster centers. Then an allocation-recalculation loop is iterated until the resulting configuration does not change any more. First, at the beginning of each iteration, the point set is allocated to the selected cluster centers by some rule, typically on a shortest distance basis. At the second part of the iteration, after the clusters are formed by the allocation procedure, the cluster centers are ignored and new cluster centers calculated within each of the ready clusters by selecting the optimal cluster center in each cluster formed. After this cluster center recalculation phase, the allocation of the points will be restarted for the new set of cluster centers, etc.

However, for embodiments of the present invention a method for the clustering of the network sites, based on the K-means method but improving that method, is provided which takes into account the special features of the problem addressed by the present invention.

Given a set P of n points to be clustered, this K-means-based clustering method works as follows:
1. (Initialization) Let the number of desired clusters k:=1. Set the total cost value for the overall best configuration found bestcost:=infinite. Set iterfails:=0;
2. (Iteration for k) Select k cluster centers from the point set P randomly. Set the total cost value for the best configuration found with k clusters actualcost:=infinite. Set fails:=0.
3. (Allocation-Recalculation Loop) While fails<MAXITERFAILS do:
   3.1. (Allocation) Allocate the point set to the selected cluster centers according to the actual clustering phase rules. Perform an iteration for the elements of the point set. In each iteration step, when allocating a point p to some cluster center, perform another iteration for the possible cluster centers. Allocate point p to that cluster center g where the change $D_q(p)$ in the total cost after the allocation of point p will be minimal among all possible cluster centers q.
   3.2. (Local Optimization, Level 3) If LOCOPT=3, then perform local optimization on the current solution to improve the allocation of the points to the cluster centers.
   3.3. (Improvement Check) If the cost of the current configuration is smaller than actualcost, then update actualcost and store the current configuration as the best configuration found for k clusters, and let fails:=0: Otherwise let fails:=fails+1.
   3.4. (Exit point) If the current configuration is identical to the configuration after the previous recalculation phase, then the allocation-recalculation loop is stopped, go to Step 4.
   3.5. (Recalculation) Recalculate the optimal location of each cluster center within its respective cluster formed by the points of the cluster and check the cost of the configuration with that point acting as cluster center. Perform this cluster center recalculation in all clusters sequentially.
   3.6. (Improvement Check) If the cost of the current configuration is smaller than actualcost, then update actualcost and store the current configuration as the best configuration found for k clusters, and let fails:=0. Otherwise let fails:=fails+1.
4. (Local Optimization, Level 2) If LOCOPT=2, then perform local optimization on the best configuration found with k clusters to improve the allocation of the points to the cluster centers.
5. (Improvement Check) If the cost of the current final configuration for k clusters, actualcost is smaller than the cost of the overall best configuration found so far, bestcost, i.e., if actualcost<bestcost, then update bestcost and modify the overall best configuration found according to the current one and let iterfails:=0. Otherwise let iterfails:=iterfails+1.
6. (Termination Check) If iterfails>LOOKAHEAD, then go to Step 7. Otherwise let k:=k+1 and go to step 2.
7. (Local Optimization, Level 1) If LOCOPT=1, then perform local optimization on the overall best configuration found to improve the allocation of the points to the cluster centers.
8. (Stop) Return the overall best configuration found as the final solution.

The following are the parameters of the K-means based clustering procedure:

LOCOPT=Desired level of local optimization (0, 1, 2 or 3). It specifies the frequency of the application of the local optimization procedure (see below). The lowest level is level 1, when the local optimizer is performed only at the very end of the clustering, for the final configuration found. At intermediate level 2, local optimization is performed for every increasing k, for the configuration resulting after the termination of the allocation-recalculation loop for each k. Finally, if the optimization level is set to 3, then local optimization is performed within each allocation-recalculation loop, after each allocation phase, for all values of k. If LOCOPT=0, then no local optimization will be performed.

MAXITERFAILS=Termination condition for the allocation-recalculation loop for a fixed k. If the best solution for fixed k does not improve in the specified number of subsequent allocation-recalculation steps, then the allocation-recalculation loop is finished and the best configuration found for the actual value of k will be recalled. In practice this parameter is set to a small value such as 2.

LOOKAHEAD=Termination condition for the whole procedure. If the increasing number of clusters k does not bring a better configuration for the specified number of subsequent iterations, the clustering procedure is finished. In practice this parameter is set to a small value such as 3.

The above procedure is not deterministic, its result depends on the actual random cluster centers selected in Step 2 for each k. In practice, the above procedure is repeated iteratively and then the overall best configuration is selected from the results from the individual runs. The number of individual runs is a design parameter—selected by the global control algorithm (see below)—it depends in the actual size of the point set and on the global problem size. The number k of initial clusters in Step 1 is set to start from a larger value based on experience from previous runs. Except for the first run, the initial value of k is set to be the half of the final number of clusters of the solution coming from the previous run. This action saves considerable running time.

Iterative Splitting

Based on published clustering methodologies (see literature reference [5]), the second method for clustering follows an iterative splitting approach. It starts from one initial cluster. In each iteration step, the biggest cluster is divided into two separate clusters and new cluster centers are calculated within each cluster. The whole process is iterated as long as there is improvement in the actual configuration. Similarly to the K-means based procedure, there are local optimization steps may be embedded in the procedure, which can be applied at the desired frequency level.

Given a set P of n points to be clustered, the iterative splitting algorithm clusters the point set as follows:

1. (Initialization) Let the number of clusters k:=1. Find the cluster center for 1 cluster and let the total cost value for the overall best configuration found—bestcost—be the total cost of the resulting configuration with 1 cluster.
2. (Iteration) Select. the largest cluster C of the actual configuration.
3. (Splitting) Split the points of cluster C into two new clusters C1 and C2 as follows:
    3.1. (Random Seeds) Let P1 and P2 be two distinct random points chosen from C.
    3.2. (Refine Seeds) Iteratively select a point Q randomly from C SEEDSAMPLE times. In each iteration, check if swapping P1 or swapping P2 with Q would yield a larger geometrical distance between P1 and P2. In that case, swap P1 or P2 with Q. At the end of this operation P1 and P2, the two cluster seeds, will be far enough from each other.
    3.3. (Initialize Geometrical Centers) Let C1 contain only P1 and C2 contain only P2. Delete P1 and P2 from C. Let the geometrical centers S1 and S2 for the two clusters C1 and C2 be P1 and P2, respectively.
    3.4. (Allocate Points) While the union of C1 and C2 does not contain all the elements of C, do:
    3.5. (Iteration for Candidates) Let bestdiff:=0. Iterate steps 3.5.1.-3.5.3 CANDSAMPLE times.
        3.5.1. (Select Candidate) Select a point Q from C randomly.
        3.5.2. (Evaluate Candidate) Let diff=ABS [dist(Q, S1)-dist(Q,S2)], i.e. the absolute difference between the geometrical distances of Q and the two geometrical centers, i.e., of Q,S1 and Q,S2.
        3.5.3. (Candidate Check) If diff>bestdiff, then let bestdiff:=diff and bestQ:=Q
    3.6. (Add Point) Add point bestQ to the cluster (C1 or C2), of which the geometrical center is closer to bestQ. Update the geometrical cluster center (S1 or S2) of the selected cluster according to the inclusion of bestQ. Delete bestQ from the point set C.
    3.7. (Add new clusters) Let k:=k+1. Delete the original cluster C from the actual configuration and add the two new clusters C1 and C2 to the actual configuration.
4. (Find Cluster Centers) Find the best cluster centers within the two new clusters C1 and C2 by the recalculation method described at the K-means-based procedure (i.e., by testing all the points as candidates for cluster center and selecting the configuration with the least total cost, separately for both clusters).
5. (Local Optimization, Level 2) If LOCOPT=2, then perform local optimization on the current configuration to improve the allocation of the points to the actual k cluster centers.
6. (Termination Check) If the total cost for the current configuration os smaller than bestcost, then update bestcost and the overall best configuration found according to the current configuration, and go to Step 2. Otherwise go to Step 7.
7. (Local Optimization, Level 1) If LOCOPT=1, then perform local optimization on the overall best configuration found to improve the allocation of the points to the cluster centers.
8. (Stop) Return the overall best configuration found as the final solution.

The parameters of the above splitting algorithm are as follows:

LOCOPT=Desired level of local optimization (0, 1 or 2). At the lower level 1, local optimization is performed only at the end of the splitting process for the final configuration. At the level 2, local optimization is performed after each splitting step for the actual configuration. If LOCOPT=0, then no local optimization will be performed.

SEEDSAMPLE=The sample size of testing for better initial cluster seeds. The objective of sampling more seed candidates is to facilitate that two far points of the point set will be selected for cluster seeds. In practice typically a small value such as 10 suffices, and the whole seed sampling feature is included to eliminate the need for scanning of all n*(n−1) possibilities for initial seeds.

CANDSAMPLE=The sample size when deciding upon the next included point at the splitting of the actual cluster into two. The objective of applying a sampling for candidates is to facilitate the final selection of a point where the difference between the two distances from the point to the two geometrical cluster centers is large enough. By this feature the algorithm is forced to select those points which are much closer to one of the clusters than to the other, i.e. their inclusion into the closer cluster will be a good decision.

Local Optimization

In either of the clustering procedures described above (K-means-base or iterative splitting) There are two places when local optimization can be performed on the actual configuration:
- within a clustering phase to improve the quality of the clustering result, and
- between the two clustering phases to facilitate the merging of the results of the different clustering phases and to improve the quality of the solution.

The same kind of local optimization algorithm may applied in both cases above. During local optimization, in general, the structure of the actual solution is iteratively perturbed or slightly altered in a systematic way, and the resulting new solutions will be accepted if they are better than the actual best one. A given actual solution point is started from and then better and better neighbouring solutions are proceeded to, as far as is possible. The following issues are involved in the local optimization process:
- what is the neighbourhood function, i.e. how do we alter the current solution to get to neighbouring solutions,
- what is the order of traversing the set of neighbouring solutions,
- what is to be if a better neighbouring solution is found, i.e. when should the current solution be updated to a neighbouring solution.

The neighbourhood is usually defined by so-called improvement operators, which are local operations to be performed on the current solution. For example, the following operators may be employed in embodiments of the present invention:
- moving an RBS from its corresponding HUB to a new HUB (RBS move)
- moving a HUB from its corresponding RNC to a new RNC (HUB move)
- swapping the corresponding HUB's of two RBS's (HUB swap)
- swapping the corresponding RNC's of two HUB's (RNC swap)

When considering all input possibilities for the above operations, those move or swap attempts are omitted where the new position of the parent site of a site would be extremely far compared to its current parent site. This extra checking operation saves (computational) running time considerably when generating all possible move and swap attempts when scanning the neighbourhood.

The neighbourhood is scanned in a kind of lexicographic order and all possible RBS or HUB move and HUB or RNC swap attempts are generated, except for that rather large portion of improvement attempts which can be simply excluded due to the observation that no site should be connected to extremely far parent sites. Concerning the updating of the actual solution, the first-improvement strategy is followed, i.e. scanning the neighbourhood of the current solution is immediately stopped and update effected whenever a better configuration is found. The process of generating neighbouring solutions is then restarted for the new solution. The whole local optimization process is stopped when none of the neighbouring solutions of the current solution is better than itself i.e., when a so-called locally optimal solution (with respect to the defined neighbourhood function) is reached.

Initial Configuration

The initial configuration is created by a special initial application of the clustering methods. Firstly, all network sites are labelled as individual HUB's with no incoming traffic links except their own traffic. Then this setting is considered as the input to the second clustering phase, i.e. to the clustering of existing HUB's to find RNC clusters and RNC locations. When the RNC positions are determined and the HUB's are connected to RNC's, each HUB is labelled back to be an RBS, except the selected RNC's, and the RBS's are connected to their corresponding RNC. This simple operation yields a feasible solution to the access network planning problem with no HUB's. The iteration of the clustering phases is then started, c.f. the global control algorithm above.

Figure 4A:
FIG. 4a schematically illustrates an example of an array of (1000) points, representing nodes in an access network which is to be optimized by means of an embodiment of the present invention.
Figure 4B:
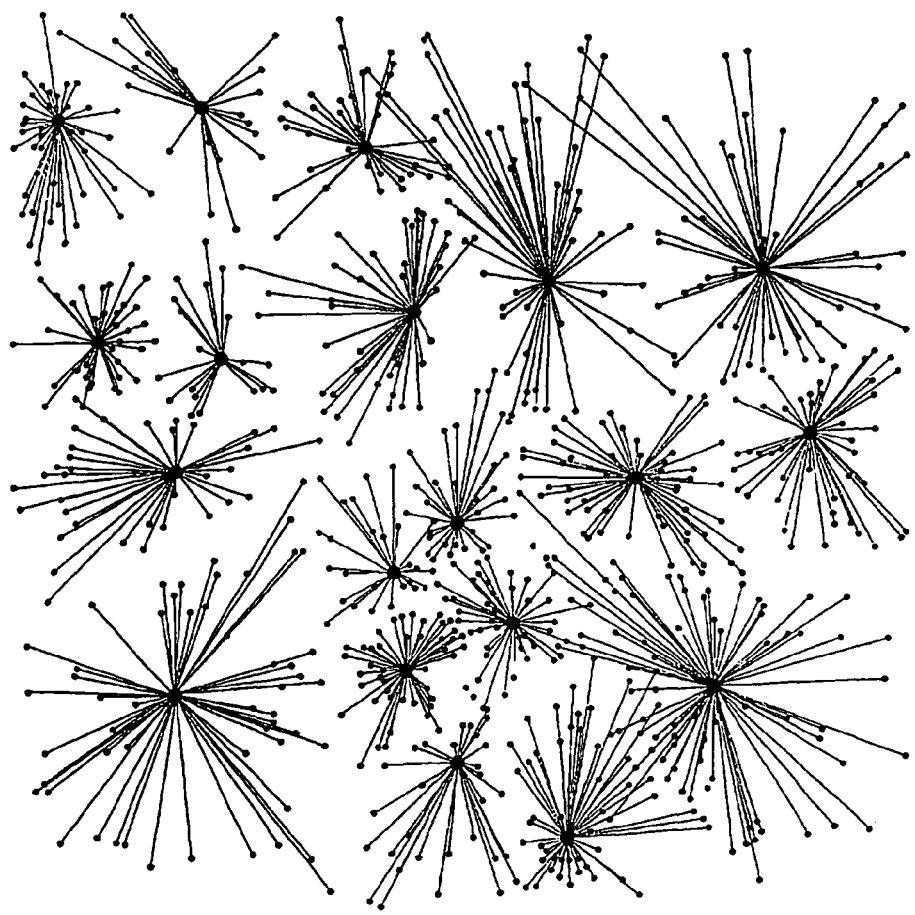

By way of example, FIGS. 4a and 4b illustrate an instance of a sample problem, and the initial solution or initial configuration generated by the above procedure, applying the iterative splitting clustering.

FIG. 4a illustrates a sample problem in which n=1000 points (RBS's) are provided as input for an embodiment of the present invention. FIG. 4b the shows the initial solution or initial configuration provided as indicated above. In this initial solution the 1000 RBS's are clustered to 19 HUB's, to which they forward traffic, whilst the 19 HUB's are clustered 1-to-1 (i.e. in this case connected or coincident 1-to-1) with 19 corresponding RNC's. (It will be understood that, in the context of the present invention, a cluster of nodes may be constituted by a single node.) In FIG. 4b the larger black points indicate RNC's/HUB's, whilst the smaller points indicate RBS's.

Global Control Algorithm

The global control algorithm described above requires consideration of a number of design issues:
- a which clustering algorithm should be applied in the actual clustering phase,
- what level of local optimization should be performed within and between the two clustering phases,
- what should be the control parameters of the clustering methods.

In preferred embodiments of the invention, the global control algorithm first starts with quicker splitting clustering variants, and gradually switches to the application to the more complicated K-means-based clustering method if the current solution fails to improve with the currently applied clustering method. The level of local optimization and the number of individual executions of the K-means based clustering is increased similarly in a gradual way. Naturally the more complicated clustering methods and deeper levels of local optimization can provide better solution quality, but the (computational) running time will also be larger for each iteration when applying them. This is why the quicker but still reasonable clustering heuristics are performed at the beginning phases of the global algorithm.

In a particularly preferred embodiment of the invention, the following 8 types of clustering variants are performed gradually (i.e. in succession, in iterations or runs, to force the optimization process):
- splitting method, LOCOPT=0
- splitting method, LOCOPT=1
- splitting method, LOCOPT=2
- K-means-based method, LOCOPT=1, runs=1
- K-means-based method, LOCOPT=2, runs=1
- K-means-based method, LOCOPT=2, runs=2
- K-means-based method, LOCOPT=3, runs=1
- K-means-based method, LOCOPT=3, runs=2

The—less important—control parameters of the clustering methods, may for example be set as follows in this particularly preferred embodiment:
Splitting method:
  SEEDSAMPLE=9
  CANDSAMPLE=9

K-means-based method:
  MAXITERFAILS=3
  LOOKAHEAD=3

In this particularly preferred embodiment of the present invention, the global control algorithm is iterated until 8 unsuccessful (i.e., the globally best configuration is unchanged in the last 8 iterations) clustering phases have occurred. Local optimization is set to be applied in between every successive clustering phase.

Of course, other variants of clustering methods may be performed, in different sequences and iterations or runs, and with different control parameters, in accordance with other embodiments of the present invention.

Practical Example

The usability of the approach involved in the present invention is demonstrated below with reference to an artificial but nonetheless practical example. It is noted that this practical example is very limited and naturally cannot exhaust all the capabilities of the approach involved in the present invention.

Input, Costs and Constraints. The instance of the sample problem depicted in FIG. 4a was used as input. The traffic of each RBS was selected randomly from the range 1.4 Mbit/s ±0.5 Mbit/s. The applied very simple cost structure was the following:

1. Link-cost (parameters: d=distance, bw=bandwidth):
The link-cost depends on the bandwidth and there are four types of links:
A) bw<=2.0:cost=1000+(d/10000)*100
B) 2.0<bw<=8.0:cost=2000+d*5+(d/10000)*150
C) 8.0<bw<=34.0:cost=6000+d*7+(d/10000)*200
D) bw>34.0:cost=12000+d*15+(d/10000)*300

2. HUB-cost (only parameter: number of connected RBS's):
There are two HUB types now only depending on the connected RBS's:
  RBSnum<25:cost=20000
  RBSnum<50:cost=35000

3. RNC-cost (parameters: number of connected RBS's and total traffic):
First, the needed number of processors is calculated by the following formulae:

processors=$RBS$num/1.9+0,7*TOTALTRAFFIC/0.36+1

There are two RNC types now only depending on the needed number of processors:
A) processors<50:cost=800000
B) 50<processors<300:cost=2000000

Solution. The problem instance was solved by the approach in accordance with the particularly preferred embodiment of the present invention as described above under the heading "Global Control Algorithm", on a Sun Ultra 5. The solution process took 361 seconds. Besides the implementation details, the (computational) running time naturally depends on the termination condition to a great extent, therefore the above running time figure only indicates the magnitude of the speed offered by the approach in accordance with the present invention.

Figure 5:
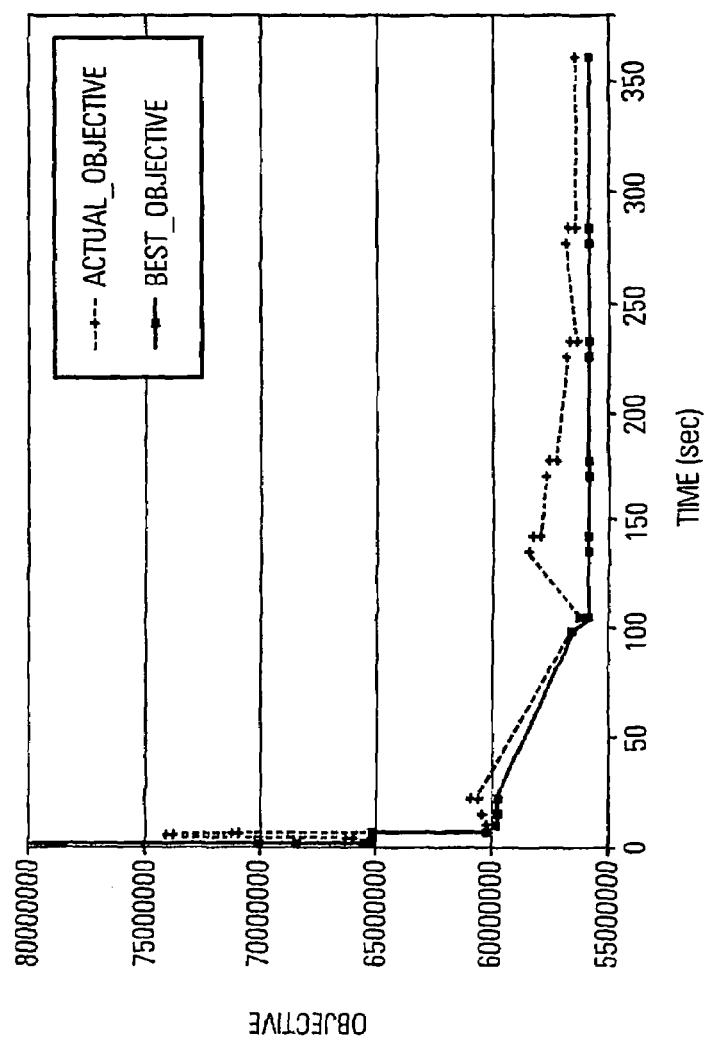
FIG. 5 is a graph illustrating the quality of solutions provided by optimization in accordance with an embodiment of the present invention, in dependence upon time spent in arriving at the solutions.

For a better understanding, the-graph of FIG. 5 shows the change of the solution quality versus the spent (computational) running time. It can be observed that the final answer was in this case actually found already after 100 seconds but the solution process was naturally continued until reaching the termination condition.

Figure 6:
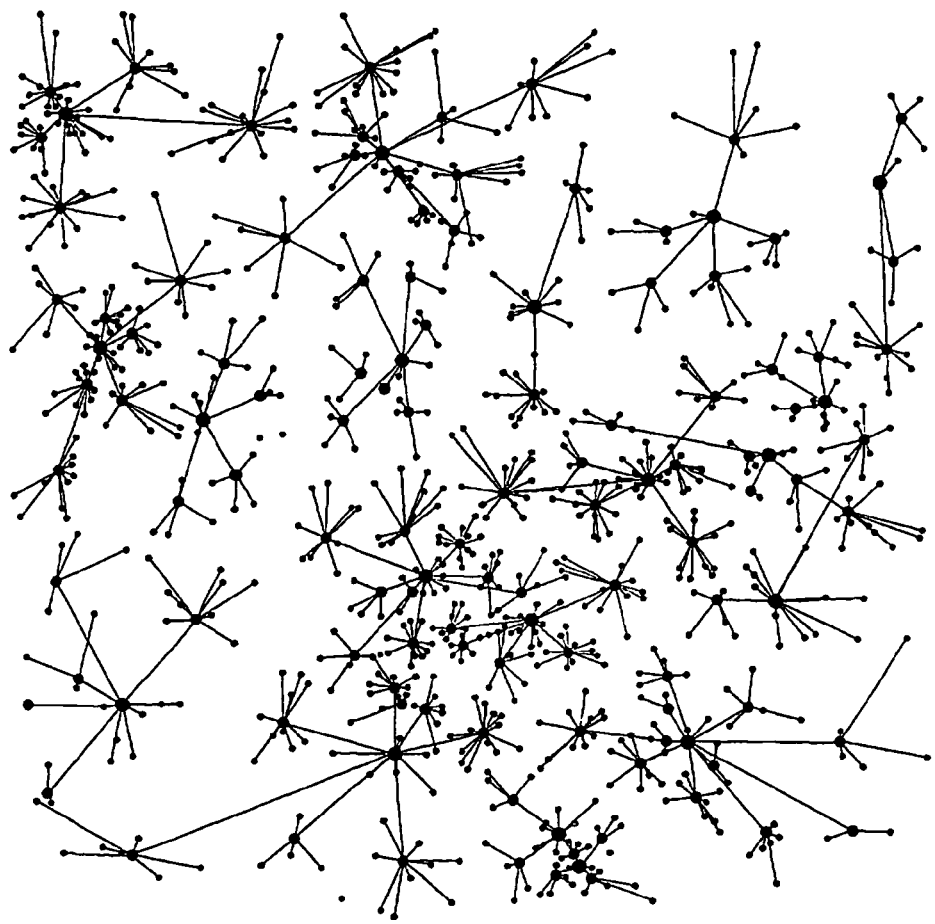
FIG. 6 schematically illustrates a final network configuration for the array of FIG. 4a, provided by optimization in accordance with an embodiment of the present invention.

FIG. 6 illustrates the network structure of the final solution found by the algorithm described above, in accordance with the present invention. In FIG. 6, the smallest black points represent RBS's (1000 in number), the rather larger black points represent HUB's, of which there are 123, and the largest black points represent RNC's, of which there are 19.

Figure 7:
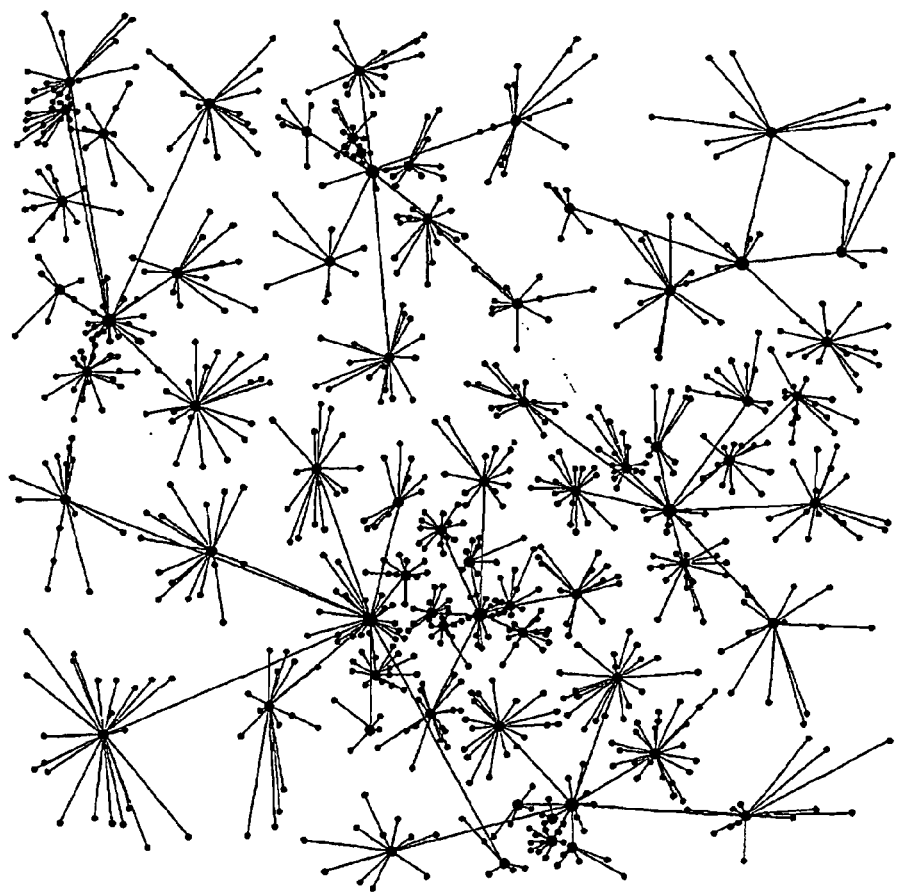
FIG. 7 schematically illustrates a different final network configuration for the array of FIG. 4a, provided by optimization in accordance with an embodiment of the present invention when parameters set as conditions for optimization are altered.

To demonstrate the flexibility of the approach employed in accordance with the present invention, in the further example modified the RNC cost function was modified. The costs of the two RNC types were multiplied by two, and the number of processors in each RNC was also multiplied by two. By this action, the RNC capabilities are made larger but their cost is also made higher. FIG. 7 shows the final result with this cost setting, with the HUB and link-costs remaining unchanged. The result was achieved in 66 seconds (computational) running time. In the configuration or solution FIG. 7 for the 1000 RBS's (smallest black points) there are 69 Hub's (rather larger black points) and 7 RNC's (largest black points).

From the above in will be understood that the present invention has the following significant merits and can offer further advantages in relation to the optimization of networks:— can be used for extension planning of existing networks; any of the links and nodes (RNC's, HUB's) can be fixed by the user at the beginning;
  equipment limitations are taken into account during network configuration optimization;
  complexity and computational resources are not high, therefore it is feasible to use the approach for practical-size problems (subphases: n remains lower);
  the method can be configured for a trade-off between solution quality and running time; it can be used either to quickly obtain a low-quality solution (a quick time estimate for e.g. strategic decisions) or to find a solution close the global optimum during a relatively longer time;
  the method can be stopped at any time, providing the best result obtained so far;
  the method is modular in the sense that it can be extended with other kinds of clustering algorithms.

In particular in relation to cost-optimization, the present invention has the further merits and advantages:—
  arbitrary link cost structures (not only distance-based) can be used, including capacity-dependent cost also;
  equipment costs can also have arbitrary structure;
  flexibility and modularity of the applied cost structure is highly supported; the method itself is independent of the cost structure, and can be used for any cost function without changes.

It will be understood that although much of the above description has been given with reference to what is basically a UMTS type access network structure, for ease and clarity of explanation, the present invention is by no means limited to such a type of access network structure. As indicated, the present invention can be applied to virtually any hierarchical access network structure (or virtually any other hierarchical network structure).

Literature References:

[1] U. Ehrenberger, K. Leibnitz: Impact of Clustered Traffic Distributions in CDMA Radio Network Planning, Technical report 223, University of Würzburg, Institute of Computer Science, March, 1999.

[2] K. Tutschku: Demand-based Radio Network Planning of Cellular Mobile Communication Systems, Technical report 177, University of Würzburg, Institute of Computer Science, July, 1997.

[3] P. Kallenberg: Optimization of the Fixed Part of GSM Networks Using Simulated Annealing. Networks 98, Sorrento, Italy, 1998.

[4] J. Harmatos, A. Jüttner, Á. Szentesi: Cost-based UTMS Transport Network Topology Optimisation. International Conference on Computer Communications '99, Tokyo, 1999.

[5] A. Jain, R. Dubes: Algorithms for clustering data. Prentice-Hall, Englewoods Cliffs, N.J., 1988.

[6] Z. Drezner (ed.): Facility Location. A Survey of Applications and Methods. Springer-Verlag, N.Y., 1995.

[7] M. S. Daskin: Network and Discrete Location. Wiley, New York, 1995.

[8] E. H. L. Aarts, J. Korst: Simulated Annealing and Boltzmann Machines: A Stochastik Approach to Combinatorial Optimization and Neural Computing. Wiley, Chicester, 1989.

[9] E. H. L. Aarts, P. J. M. van Laarhoven: Simulated Annealing: Theory and Applications. Kluwer Acedemic Publishers, 1987.

[10] C. R. Reeves (ed.): Modern Heuristic Techniques for Combinatoral Problems. McGraw-Hill, 1995.

[11] M. S. Garey, D. S. Johnson: Computers and Intractability: A Guide to the Theory of NP-Completeness. W. H. Freeman, New York, 1979.

[12] V. Verter, M. C. Dincer: Facility location and capacity acquisition: an integrated approach. Naval Res. Log. Quart. 42, 1995.

[13] Y. Eitan, S. C. Narula, J. M. Tien: A generalized approach to modeling the hierarchical location-allocation problem. IEEE Trans. Systems Man Cybernet. 21, 1991.

[14] G. Anandalingam, T. L. Friesz (ed.): Hierarchical optimisation. Ann. Oper. Res. 34, 1992.

[15] G. R. Mateus, F. R. B. Cruz, H. P. L. Luna: An algorithm for hierarchical network design. Location Science, 2, 1994.

[16] P. B. Mirchandani: Generalized hierarchical facility location. Transportation Science, 21, 1984.

[17] G. Moore, C. ReVelle: the hierarchical service location problem. Management Science, 28, 1982.

[18] S. C. Narula: Minisum hierarchical location-allocation problems on a network: A survey. Annals of Operations Research, 6, 1986.

[19] D. Serra de la Figuera, C. S. ReVelle: the pq-median problem: Location and districting of hierarchical facilities. Location Science, 1, 1993 and 2. 1994.

[20] Weaver, J. R. and Church, R. L. (1991) The nested hierarchical median facility location model. INFOR, 29, 100-115.

[21] A. Balakrishnan, K. Altinkemer: using a hop-constrained model to generate alternative communication network designs. INFORMS J. Comput. 4, 1992.

[22] B. Gavish: Topological design of telecommunication networks—local access design methods. Ann. Oper. Res. 33, 1991.

[23] B. Gavish: Topological design of telecommunication networks—the overall design problem. Eur. J. Oper. Res. 58, 1992.

The invention claimed is:

1. A method for optimization of the configuration of a hierarchical network, the network having m hierarchy levels, where m is at least 3, comprising a first hierarchy level (LEVEL(j−1)), a second hierarchy level (LEVEL(j)) next below the first hierarchy level, and a third hierarchy level (LEVEL(j+1)) next below the second hierarchy level, each hierarchy level comprising nodes (RNC's, HUB's, RBS's) each of which, in hierarchy levels other than the lowest, receives traffic from a cluster of nodes (HUB's, RBS's) of the hierarchy level next below, the method comprising the steps as follows:

setting and/or generating an initial arrangement of nodes (RNC's, HUB's, RBS's) in each of the hierarchy levels and, in each of the hierarchy levels other than the highest, allocating respective initial clusters of nodes (HUB's, RBS's) of that level to the nodes (RNC's, HUB's) of the next higher hierarchy level (LEVEL(j−1), (LEVEL(j)), iteratively repeating the following steps (a) and (b):
(a) for each node (RNC) of the first hierarchy level (LEVEL(j−1)), identifying an optimized number of, and dispositions of, nodes (HUB's) of the second hierarchy level (LEVEL(j)), for those nodes (RBS's) of the third hierarchy level (LEVEL(j+1)) which, immediately prior to this iteration of step (a), were allocated to the nodes (HUB's) of the second hierarchy level (LEVEL(j)) allocated to the node (RNC) concerned of the first hierarchy level (LEVEL(j−1)), and for each said node (RNC) of the first hierarchy level (LEVEL (j−1)), reallocating said those nodes (RBS's) of the third hierarchy level (LEVEL(j+1) to the nodes (HUB's) of the second hierarchy level (LEVEL(j)) identified in this iteration of step (a), (b) for the nodes (HUB's) of the second hierarchy (LEVEL(j)) identified in step (a), identifying an optimized number of, and dispositions of, the nodes (RNC) of the first hierarchy level (LEVEL(j−1)), and reallocating the nodes (HUB's) of the second hierarchy level (LEVEL (j)) identified instep (a) to the nodes (RNC's) of the first hierarchy level (LEVEL(j−1)) determined in this iteration of step (b), until steps (a) and (b) result in no changes in number, disposition and allocation of said nodes (RNC's, HUB's, RBS's) over a predetermined number of iterations of those steps, wherein said nodes are allocated to provide an optimized number and disposition of the nodes within the network.

2. A method as claimed in claim 1, including, immediately following step (a), for each said node (RNC) of the first hierarchy level (LEVEL(j−1)), further reallocating the nodes (RBS's) of the third hierarchy level (LEVEL(j+1)) to the nodes (HUB's) of the second hierarchy level (LEVEL(j)) belonging to the node (RNC) concerned of the first hierarchy level (LEVEL(j−1)) by applying a local optimization which provides a further optimized allocation.

3. A method as claimed in claim 1 including, immediately following step (b), further reallocating the nodes (HUB's) of the second hierarchy level (LEVEL (j) ) to the nodes (RNC's) of the first hierarchy level (LEVEL(j−1)) by applying a local optimization which provides a further optimized allocation.

4. A method as claimed in claim 1, including, after step (a), further reallocating the nodes (RBS's) of the third hierarchy level (LEVEL(j+1)) to any of the nodes (HUB's) of the second hierarchy level (LEVEL(j)) by applying a local optimization which provides a further optimized allocation.

5. A method as claimed in claim 1, including, after step (b), further reallocating the nodes (RBS's) of the third hierarchy level (LEVEL(j+1)) to any of the nodes (HUB's)

of the second hierarchy level (LEVEL(j)) by applying a local optimization which provides a further optimized allocation.

6. A method as claimed in claim 2, wherein, for applying local optimization a neighbourhood search is performed in which re-organisations, involving swapping of two nodes between clusters and/or moving one node from one cluster to another cluster, are performed iteratively until no further optimization is yielded.

7. A method as claimed in claim 6, wherein those moves or swaps are omitted from the neighbourhood search for which the allocation of a node to a new cluster would result in the node being extremely far from the node of the hierarchy level next above to which the new cluster sends traffic, as compared to the present cluster, and wherein the neighbourhood search is immediately stopped and update effected whenever a further optimized configuration of nodes is found, the neighbourhood search then being restarted for the further optimized configuration, and wherein the local optimization process is stopped when none of the resulting configurations is more optimized than the current configuration.

8. A method as claimed in claim 1, wherein said initial arrangement of nodes is set and/or generated by inputting and/or identifying the number and disposition of nodes (RNC's) of the first hierarchy level (LEVEL(j−1)), and allocating nodes of the second hierarchy level (LEVEL(j)), also input and/or identified in number and disposition, to the nodes (RNC) of the first hierarchy level (LEVEL(j−1)).

9. A method as claimed in claim 1, wherein the identification of optimized number and disposition of nodes is effected on the basis of objective evaluation of a generalized cost function, taking into account generalized costs of node equipment and generalized costs of links carrying traffic between nodes, provided as input for the method.

10. A method as claimed in claim 9, wherein to identify an optimized number of, and dispositions of, nodes of the first (LEVEL (j−1)) or second (LEVEL (j)) hierarchy level, the nodes of the hierarchy level next below which, prior to optimization, are allocated to the nodes to be optimized are re-clustered using the following procedure:

initially, set k=1 and set the overall best value of the generalized cost function to infinity, then (a) select randomly k cluster centers from the point set P defined by said nodes of the hierarchy level next below; set the best value of the generalized cost function for the current value of k to infinity;

(b) allocate the points of the point set P to the selected cluster centers according to predetermined clustering rules; iterate for the elements of the point set; in each iteration step, when allocating a point p to some cluster center. perform another iteration for the possible cluster centers; allocate point p to that cluster center q where the change $D_q(p)$ in the value of the generalized cost function after the allocation of point p is the minimum among all possible cluster centers q;

(b1) calculate the value of the generalized cost function of the current configuration; if the value of the generalized cost function of the current configuration is smaller than a previous best value of the generalized cost function found for the current value of k then update that best value of the generalized cost function and store the current configuration as the best configuration found for k clusters;

(b2) if the current configuration is identical to the configuration after the previous recalculation phase, go to (c), otherwise (b3) recalculate the optimized location of each cluster center within its respective cluster formed by the points of the cluster and check the value of the generalized cost function for the configuration with that point acting as cluster center; perform this cluster center recalculation in all clusters sequentially;

(b4) calculate the value of the generalized cost function; if the value of the generalized cost function of the current configuration is smaller than the previous best value of the generalized cost function found for the current value of k, then update that best value of the generalized cost function and store the current configuration as the best configuration found for k clusters;

(b5) iterate from step (b), until a predetermined number of iterations have failed to yield a reduced best value of the generalized cost function for the current value of k;

(c) if the value of the generalized cost function of the current final configuration for k clusters is smaller than the overall best value of the generalized cost function of the overaL best configuration found so far for any k, then update that overall best value of the generalized cost function and modify the overall best configuration found according to the current one;

(d) let k=k+1 and iterate from step (a), until a predetermined number of iterations have failed to yield a reduced overall best value of the generalized cost function.

11. A method as claimed in claim 9, wherein to identify an optimized number of, and dispositions of, nodes of the first (LEVEL (j−1)) or second (LEVEL (j)) hierarchy level, the nodes of the hierarchy level next below which, prior to optimization, are allocated to the nodes to be optimized are re-clustered using the following procedure:

initially, set k=1, then (a) for the point set P defined by said nodes of the hierarchy level next below, find the cluster center for k clusters and let the overall best value of the generalized cost function for the overall best configuration so far found be the value for the resulting configuration with k cluster(s), (b) select the largest cluster C of the actual configuration, (c) split the points of cluster C into two new clusters C1 and C2 as follows:

(c1) let P1 and P2 be two distinct random points chosen from C;

(c2) iteratively select a point Q randomly from C a number of times; in each iteration, check if swapping P1 or swapping P2 with Q yields a larger geometrical distance between P1 and P2; if so, swap P1 or P2 with Q;

(c3) let C1 contain only P1 and C2 contain only P2; delete P1 and P2 from C; let the geometrical centers Si and S2 for the two clusters C1 and C2 be P1 and P2, respectively;

(c4) while the union of C1 and C2 does not contain all the elements of C, do:

(c5) initially, let greatest absolute distance=0, then iterate the following steps (c5.1) to (c5.3) a predetermined number of times;

(c5.1) select a point Q from C randomly;

(c5.2) calculate the absolute difference between the geometrical distances of Q to the two geometrical centers S1 and S2

(c5.3) if said absolute difference is greater than the previous greatest absolute distance for any point Q, update the greatest absolute distance and the point with the greatest absolute distance;

(c6) add the point with the greatest absolute distance to the cluster (C1 or C2) of which the geometrical center is closer to that point; update the geometrical cluster center (S1 or S2) of the selected cluster according to the inclusion of that point; delete that point from the point set C;

(c7) let k:=k+1; delete the original cluster C from the actual configuration and add the two new clusters C1 and C2 to the actual configuration;

(d) find the best cluster centers within the two new clusters C1 and C2 by testing all the points as candidates for cluster centers and selecting the configuration with the least value of the generalized cost function, separately for both clusters;

(e) if the value of the generalized cost function for the current configuration is smaller than the previous best value of the generalized cost function, then update the overall best value of the generalized cost function and the overall best configuration found according to the current configuration, and go to step (b); otherwise cease iteration.

12. A computer readable medium encoded with a computer program for optimization of the configuration of a hierarchical network, the network having m hierarchy levels, where m is at least 3, comprising a first hierarchy level (LEVEL(j−1)), a second hierarchy level (LEVEL(j)) next below the first hierarchy level, and a third hierarchy level (LEVEL(j+1)) next below the second hierarchy level, each hierarchy level comprising nodes (RNC's, HUB's, RBS's) each of which, in hierarchy levels other than the lowest, receives traffic from a cluster of nodes (HUB's, RBS's) of the hierarchy level next below, said computer program comprising:

code segment for setting and/or generating an initial arrangement of nodes (RNC's, HUB's, RBS's) in each of the hierarchy levels and, in each of the hierarchy levels other than the highest, allocating respective initial clusters of nodes (HUB's, RBS's) of that level to the nodes (RNC's, HUB's) of the next higher hierarchy level (LEVEL(j−1), (LEVEL(j)), wherein the code segment iteratively repeats the following code segments of (a) and (b):

(a) code segment for each node (RNC) of the first hierarchy level (LEVEL(j−1)), identifying an optimized number of, and dispositions of, nodes (HUB's) of the second hierarchy level (LEVEL(j)), for those nodes (RBS's) of the third hierarchy level (LEVEL(j+1)) which, immediately prior to this iteration of code segment (a), were allocated to the nodes (HUB's) of the second hierarchy level (LEVEL(j)) allocated to the node (RNC) concerned of the first hierarchy level (LEVEL(j−1)), and for each said node (RNC) of the first hierarchy level (LEVEL (j−1)), reallocating said those nodes (RBS's) of the third hierarchy level (LEVEL(j+1)) to the nodes (HUB's) of the second hierarchy level (LEVEL(j)) identified in this iteration of code segment (a), (b) code segment for the nodes (HUB's) of the second hierarchy (LEVEL(j)) identified in code segment (a), identifying an optimized number of, and dispositions of, the nodes (RNC) of the first hierarchy level (LEVEL(j−1)), and reallocating the nodes (HUB's) of the second hierarchy level (LEVEL(j)) identified in code segment (a) to the nodes (RNC's) of the first hierarchy level (LEVEL(j−1)) determined in this iteration of code segment (b), until the code segments of (a) and (b) result in no changes in number, disposition and allocation of said nodes (RNC's, HUBs, RBS's) over a predetermined number of iterations of those code segments, wherein said nodes are allocated to provide an optimized number and disposition of the nodes within the network.

* * * * *